Jan. 12, 1937.　　　C. A. DOUGHERTY　　　2,067,831
SELF LUBRICATING VEHICLE SPRING
Filed May 20, 1936
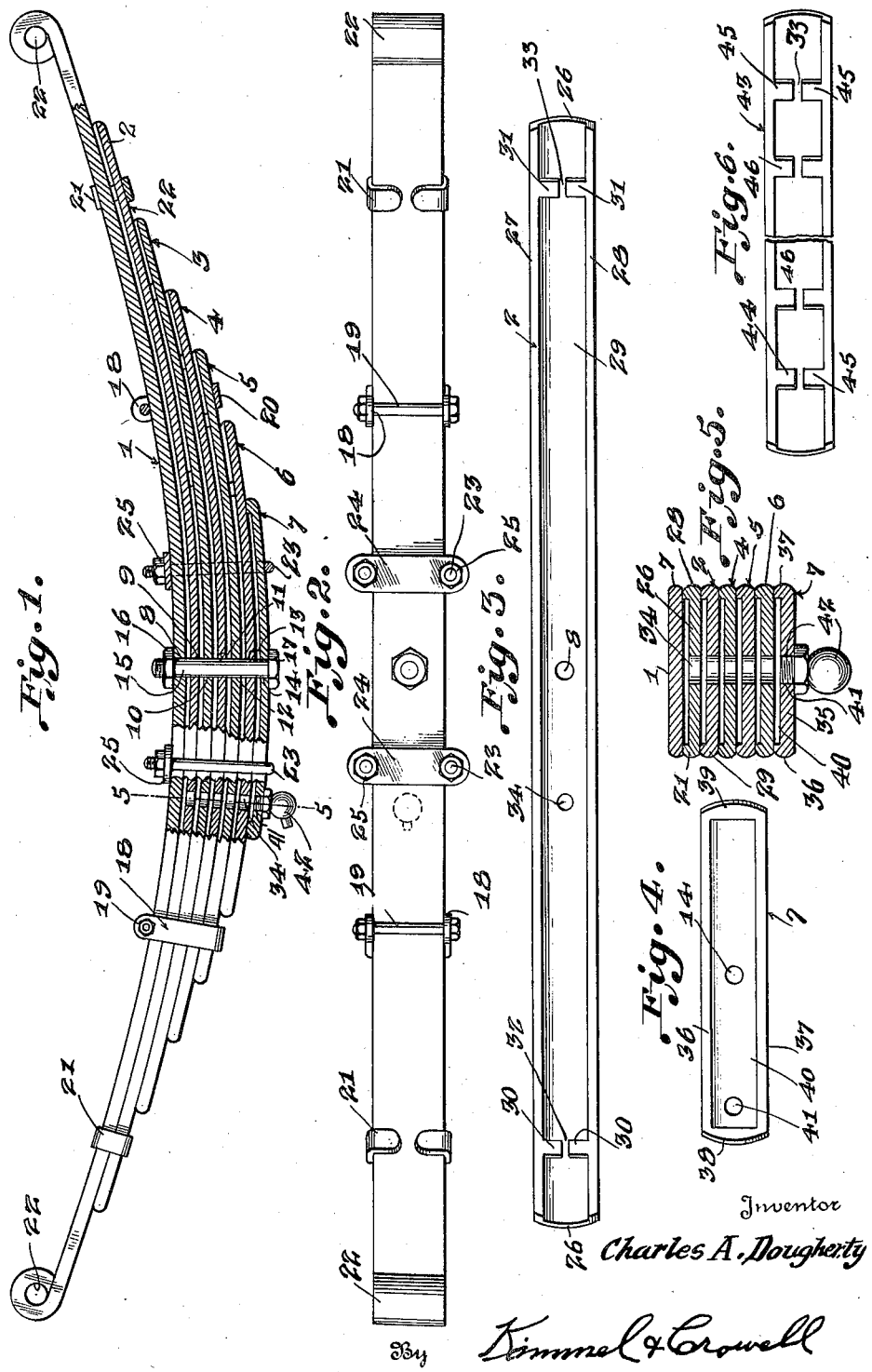
Inventor
Charles A. Dougherty
By Kimmel & Crowell
Attorneys Patented Jan. 12, 1937

2,067,831

UNITED STATES PATENT OFFICE 2,067,831

SELF-LUBRICATING VEHICLE SPRING

Charles A. Dougherty, Wilmington, Del.

Application May 20, 1936, Serial No. 80,901

7 Claims. (Cl. 267—50)

This invention relates to a self-lubricating vehicle spring.

The invention has for its object to provide, in a manner as hereinafter set forth, a vehicle spring of the laminated type with laminations thereof so formed to cause the quick, easy, and thorough lubrication thereof.

A further object of the invention is to form each of the lower laminations of the spring, in a manner as hereinafter set forth whereby the resistance and strength thereof will materially increase.

A further object of the invention is to form each of the lower laminations of the spring, in a manner as hereinafter set forth, with an intermediate portion and a pair of side portions of materially greater thickness and of less width than and coacting with the intermediate portion to provide a wide lubricant receiving space lengthwise of the lamination, and with the said side portions acting to increase the resistance and strength of the body from which the lamination is formed.

A further object of the invention is to form those laminations between the top and bottom laminations of the spring, in a manner as hereinafter set forth with an intermediate portion and a pair of side portions of materially greater thickness and of less width than and coacting with the intermediate portion to provide a wide lubricant receiving space lengthwise of the lamination opening at each end of the latter to constitute what may be termed channels and each lamination provided with means disposed transversely of the channel to retard the discharge of the lubricant from each end of the lamination.

Further objects of the invention are to provide in a manner as hereinafter set forth, a self-lubricating spring which is comparatively simple in its construction and arrangement, strong, durable, compact, thoroughly efficient when used, conveniently assembled and comparatively inexpensive to manufacture.

With the foregoing and other objects in view, the invention consists of the novel construction, combination and arrangement of parts as will be hereinafter more specifically described and are as illustrated in the accompanying drawing wherein is shown an embodiment of the invention, but it is to be understood that changes, variations and modifications may be resorted to which fall within the scope of the invention as claimed.

In the drawing:

Figure 1 is a side elevation partly in section of a self-lubricating spring in accordance with this invention, Figure 2 is a top plan view of the spring, Figure 3 is a top plan view of one of the laminations of the intermediate set of laminations, Figure 4 is a top plan view of the lowermost lamination, Figure 5 is a view on line 5—5, Figure 1, and Figure 6 is a top plan view, broken away, illustrating a modified form of the intermediate laminations.

The spring includes a top lamination or leaf 1, a set of intermediate laminations or leaves, preferably five in number, and indicated at 2, 3, 4, 5 and 6 and a bottom lamination or leaf 7. The laminations progressively increase in length from the lamination 7 to the lamination 1 and are so disposed whereby the ends of an upper lamination will extend equi-distant from the ends of a lower lamination. The laminations 1 to 7, both inclusive, at the junction of their longitudinal and transverse medians are formed with aligning openings 8, 9, 10, 11, 12, 13 and 14 respectively. The laminations 1 to 7 are secured in superimposed relation by a headed bolt 15 carrying a clamping or securing nut 16. The bolt 15 extends upwardly through the aligning openings 8 to 14 and has its head 17 abut the lower face of the lamination 7. The nut 16 abuts the upper face of the lamination 1. The laminations 1 to 7 are of segmental contour. The laminations 1 to 5 are also secured together in superimposed relation by a pair of spaced yokes 18 carrying tie bolts 19 arranged against the upper face of the lamination 1. The bases 20 of the yokes 18 are arranged against the lower face of the lamination 5. The laminations 1 and 2 are also secured together in superimposed relation by a pair of spaced coupling bands 21. The ends of the lamination 1 are formed with eyes 22 for receiving pivotal connections, not shown, for coupling spring with the vehicle. The laminations 1 to 7 are also secured in superimposed relation by a pair of spaced yokes 23 and cross members 24 mounted on the arms of the yokes 23 and bearing against the upper face of the lamination 1. Cross members 24 are held in abutting engagement relative to the lamination 1 by the securing nuts 25 carried by the arms of the yokes 23. The bases of the yokes 23 abut against the lower face of the lamination 7. The laminations 2 to 6 both inclusive are provided with a lengthwise extending intermediate portion 26, as illustrated in Figure 3 with respect to the lamination 2 and each of the laminations 2 to 6 inclusive is formed with a pair of side portions 27, 28, as illustrated in Figure 3, with respect to the lamination 2. The intermediate portion 26 and side portions 27, 28 correspond in length to that of the body of the lamination. The intermediate portion 26 is of materially less thickness and of materially greater width than that of the side portion 27 or 28. The side portions 27, 28 are of uniform thickness throughout. The intermediate portion 26 coacts with the side portions 27, 28 to provide a wide lubricant receiving space 29 which is termed a lubricant conducting-off channel. Each of the laminations 2 to 6 is formed in proximity to each end with a pair of oppositely disposed transversely extending spaced inner endwise aligning webs, such as indicated at 30, 31 on Figure 3 with respect to the lamination 2. The webs 30, 31 constitute retarders and the space between the webs 30 forms a lubricant outlet passage 32 and the space between the webs 31 forms a lubricant passage 33. The webs are integral with the upper face of the intermediate portion 26 and have their upper faces flush with the upper faces of the side portions 27, 28.

Each of the laminations 2 to 6 both inclusive are formed with aligning openings 34 constituting lubricant intakes for the recesses or lubricant conducting-off channels 29. The openings 34 preferably will be arranged in proximity to one of the yokes 23. The lower faces of the laminations 1 to 5 inclusive constitute top walls for the recesses 29 formed in the laminations 2 to 6 both inclusive, respectively.

The lamination 7 includes an intermediate portion 35, a pair of side portions 36, 37 and a pair of end portions 38, 39. The intermediate portion 35 is of materially less thickness and of greater width than the side portions 36, 37. The intermediate portions 35 is of materially less thickness and of greater width than the end portions 38, 39. The intermediate portion 35 coacts with the portions 36, 37, 38 and 39 to provide a rectangular lubricant receiving chamber 40. The bottom of the latter near one end is provided with an opening 41 having a threaded wall. The lower face of the lamination 6 provides a top wall for the chamber 40. Anchored to the wall of opening 41 is a lubricant fitting 42.

The modified form of lamination or leaf shown in Figure 6 is indicated at 43 and is constructed in the same manner as the laminations 2 to 6 inclusive with this exception that in addition to the webs 44, 45 located in proximity to the ends of the laminations it is also provided with spaced pairs of webs 46. The webs 44, 45 and 46 are set up in the same manner as the webs 30, 31 and function for the same purpose as the webs 30, 31.

Each of the laminations 2 to 5 inclusive is formed from rolling or compressing imperforated flat straps of resilient metallic material of the desired length, of the desired gauge and are of uniform thickness throughout in a manner to provide the side portions 27, 28 and the intermediate portion 26. The side portions 27, 28 are of greater thickness and of less width than the intermediate portion 26. By rolling or compressing the strap to obtain the foregoing structural arrangement, it materially increases the resistance and strength of the lamination.

With respect to the laminations 2 to 6 both inclusive, when provided by rolling or compressing the strap, it is formed inwardly adjacent its ends with the pairs 30, 31 of the transversely disposed, spaced, inner endwise aligning webs on its intermediate portion 26. The webs merge into the inner lengthwise edges and are flush with the outer surface of the side portions 27, 28.

The lower lamination 7 is formed from rolling or compressing a flat imperforated strap of resilient metallic material of the desired length, of the desired gauge and of uniform thickness throughout in a manner to provide the side portions 36, 37 and the end portions 38, 39 and also the intermediate portion 35. The side and end portions being of materially greater thickness than the intermediate portion 35. The latter is materially greater in width than that of the side portions 36, 37. The manner of forming the lamination 7 materially increased the resistance and strength thereof.

The openings as shown in the laminations 2 to 7 both inclusive are provided therein after the straps are rolled or compressed to provide structural arrangement, as stated of the laminations 2 to 7.

What I claim is:

1. In a self-lubricating spring, a structure formed of a series of superimposed laminations of segmental contour, means at the vertical center and adjacent each side of the latter for securing the laminations in superimposed relation, each of said laminations between the top and bottom laminations being formed with a pair of upstanding side portions and an intermediate portion, said side portions being of greater thickness and of materially less width than said intermediate portions, said side portions and intermediate portions coacting to form wide lubricant conducting-off channels opening at the ends of said structure, said intermediate portions having means adjacent one side of said central means for establishing communication between said channels, having transversely disposed spaced lubricant retarders integral with the upper faces of said intermediate portions and the inner edges of said side portions and said bottom lamination being formed with a lubricant receiving chamber opening into that lamination superimposed thereon.

2. In a self-lubricating spring, a series of superimposed laminations, each having its upper face formed with a wide channel extending from end to end thereof and with spaced retarders extending transversely of and of a length less than the width of the channel, each channel being open at each end of a lamination, the said retarders being spaced from the ends of the channels.

3. In a self-lubricating spring, a series of superimposed laminations, each having its upper face formed with a wide channel extending from end to end thereof with spaced retarders extending transversely of said channels, the said retarders being spaced from the ends of the channels, said retarders being integral with the bottom and sides of said channels, arranged in pairs, and with the retarders of each pair being disposed in inner endwise aligned spaced relation.

4. In a self-lubricating spring, a series of superimposed laminations, each having its upper face formed with a wide channel extending from end to end thereof and with spaced retarders extending transversely of said channel, said channel being open at each end, said retarders being of less length than the width of the channel and integral with the bottom and side walls of the channel.

5. For use in self-lubricating springs, a lamination comprising a one-piece body having its upper face provided with a wide channel extending from one end to the other end of said body, said channel being open at each end, said body being formed on its upper face with spaced upstanding parts within and disposed transversely of said channel, said parts having the length thereof less than the width of said channel.

6. For use in self-lubricating springs, a lamination comprising a one-piece body having its upper face provided with a wide channel extending from one to the other end of said body, said channel being open at each end, said body being formed on its upper face with spaced upstanding parts within and disposed transversely of said channel, said parts having their length thereof less than the width of said channel, said channel being formed with a pair of side walls and a bottom, said parts being integral with said bottom, certain of said parts being integral at one end with one side wall of the channel and the others of said parts being integral at one end with the other side wall of the channel.

7. For use in self-lubricating springs, a lamination comprising a one-piece body having its upper face provided with a wide channel extending from one end to the other end of said body, said channel being open at each end, said body being formed on its upper face with spaced upstanding parts within and disposed transversely of said channel, said parts having the length thereof less than the width of said channel, said channel being formed with a pair of side walls and a bottom, said parts being integral with said bottom, certain of said parts being integral at one end with one side wall of the channel and the others of said parts being integral at one end with the other side wall of the channel, and said parts being located in proximity to the open ends of said channel.

CHARLES A. DOUGHERTY.